United States Patent
Tsoupko-Sitnikov et al.

(10) Patent No.: US 11,578,981 B1
(45) Date of Patent: Feb. 14, 2023

(54) CONSTRAINED REGISTRATION OF MAP INFORMATION

(71) Applicants: Mikhail Tsoupko-Sitnikov, Campbell, CA (US); Lukas M. Marti, San Jose, CA (US)

(72) Inventors: Mikhail Tsoupko-Sitnikov, Campbell, CA (US); Lukas M. Marti, San Jose, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 15/939,694

(22) Filed: Mar. 29, 2018

Related U.S. Application Data (60) Provisional application No. 62/478,250, filed on Mar. 29, 2017.

(51) Int. Cl.
*G01C 21/30* (2006.01)
*G01C 21/34* (2006.01)

(52) U.S. Cl.
CPC ............. *G01C 21/30* (2013.01); *G01C 21/34* (2013.01)

(58) Field of Classification Search
CPC ................................. G01C 21/30; G01C 21/34
See application file for complete search history.

(56) References Cited

U.S. PATENT DOCUMENTS

| | | | |
|---|---|---|---|
| 7,353,108 B2 | 4/2008 | Adachi | |
| 8,639,654 B2 | 1/2014 | Vervaet et al. | |
| 8,645,061 B2 | 2/2014 | Newson et al. | |
| 8,954,265 B2 | 2/2015 | Hagan | |
| 9,052,207 B2 | 6/2015 | Miksa et al. | |
| 9,395,190 B1 | 7/2016 | Young et al. | |
| 2007/0198184 A1* | 8/2007 | Yoshioka | G09B 29/106 701/426 |
| 2013/0030692 A1* | 1/2013 | Hagan | G06F 16/29 701/410 |
| 2013/0158865 A1 | 6/2013 | Na et al. | |
| 2014/0132608 A1 | 5/2014 | Mund et al. | |
| 2014/0149032 A1 | 5/2014 | Barrett et al. | |
| 2015/0153183 A1 | 6/2015 | Kadous et al. | |
| 2015/0354973 A1 | 12/2015 | Wang et al. | |
| 2017/0003134 A1 | 1/2017 | Kim et al. | |

(Continued)

FOREIGN PATENT DOCUMENTS

| | | | |
|---|---|---|---|
| EP | 1300652 A2 | 4/2003 | |
| EP | 2541203 B1 | 9/2015 | |
| JP | 5068249 B2 | 11/2012 | |

*Primary Examiner* — Imran K Mustafa
(74) *Attorney, Agent, or Firm* — Young Basile Hanlon & MacFarlane, P.C.

(57) ABSTRACT

A method includes determining a first route from a first location to a second location using a first map that includes first map elements, wherein the first route includes a series of the first map elements from the first map. The method also includes matching the series of the first map elements from the first route to second map elements from a second map to define a subset of the second map elements, and determining a second route from the first location to the second location using the subset of the second map elements. The second route is constrained to the subset of the second map elements and the second route includes a series of the second map elements from the subset of the second map elements. The method also includes outputting information describing the second route for at least one of storage or display.

26 Claims, 8 Drawing Sheets

(56) References Cited

U.S. PATENT DOCUMENTS

| | | | |
|---|---|---|---|
| 2017/0008562 A1* | 1/2017 | Shashua | G06K 9/00798 |
| 2017/0219364 A1 | 8/2017 | Lathrop et al. | |
| 2018/0245938 A1 | 8/2018 | Song et al. | |
| 2020/0057436 A1* | 2/2020 | Boda | G05D 1/0022 |

* cited by examiner

CONSTRAINED REGISTRATION OF MAP INFORMATION

CROSS-REFERENCE TO RELATED APPLICATIONS

This application claims the benefit of U.S. Provisional Application No. 62/478,250, filed on Mar. 29, 2017, and entitled "Constrained Registration of Map Information," the content of which is incorporated herein by reference in its entirety for all purposes.

TECHNICAL FIELD

The application relates generally to the field of digital maps.

BACKGROUND

Digital maps store mapping information in a computer-interpretable format, and can include and display features similar to those associated with traditional paper maps, such as geographical features, topographical features, political boundaries, attractions, and transportation networks. Transportation network features that can be displayed on maps include roadways, transit routes, walking paths, and biking paths. In addition, maps can be annotated with various types of information, such as locations and descriptions of businesses.

One typical usage case for digital maps involves route planning between a starting point and a destination. Route planning is performed on a device that stores or has access to navigational map data. Another typical usage case involves route planning performed on a remote server that has access to the navigational map data, and transferring the route to the device. In both cases a single map (i.e., collection of map information) is used for generating route and displaying the route.

SUMMARY

One aspect of the disclosed embodiments is a method includes determining a first route from a first location to a second location using a first map that includes first map elements, wherein the first route includes a series of the first map elements from the first map. The method also includes matching the series of the first map elements from the first route to second map elements from a second map to define a subset of the second map elements, and determining a second route from the first location to the second location using the subset of the second map elements. The second route is constrained to the subset of the second map elements and the second route includes a series of the second map elements from the subset of the second map elements. The method also includes outputting information describing the second route for at least one of storage or display.

Another aspect of the disclosed embodiments is a non-transitory computer-readable storage device including program instructions executable by one or more processors that, when executed, cause the one or more processors to perform operations. The operations include determining a first route from a first location to a second location using a first map that includes first map elements, wherein the first route includes a series of the first map elements from the first map. The operations also include matching the series of the first map elements from the first route to second map elements from a second map to define a subset of the second map elements, and determining a second route from the first location to the second location using the subset of the second map elements. The second route is constrained to the subset of the second map elements and the second route includes a series of the second map elements from the subset of the second map elements.

Another aspect of the disclosed embodiments is a system that includes a memory and a processor configured to execute instructions stored in the memory. The instructions cause the processor to determine a first route from a first location to a second location using a first map that includes first map elements, wherein the first route includes a series of the first map elements from the first map. The instructions also cause the processor to match the series of the first map elements from the first route to second map elements from a second map to define a subset of the second map elements, and determine a second route from the first location to the second location using the subset of the second map elements. The second route is constrained to the subset of the second map elements and the second route includes a series of the second map elements from the subset of the second map elements.

Another aspect of the disclosed embodiments is a method that includes determining a base route from a first location to a second location using a base map. The base map includes base segments that are described as polyline segments, and the base route includes a series of the base segments from the base map. The method also includes determining route points that correspond geometrically to locations of the series of the base segments such that the route points extend along the base route. The method also includes matching tactical segments from a tactical map to the route points to identify matching tactical segments based on a distance between the tactical segments and the route points. The method also includes matching, for each of the tactical segments, one or more tactical lanes to the route points to identify matching tactical lanes, wherein each of the tactical lanes is a portion of a corresponding one of the tactical segments. The method also includes determining a second route from the first location to the second location using the matching tactical lanes, wherein the second route is constrained to the matching tactical lanes and the second route includes a series of the tactical lanes from the matching tactical lanes. In some implementations, the method also includes identifying additional tactical segments from the tactical map based on proximity to the matching tactical segments and adding the additional tactical segments to the matching tactical segments. In some implementations, the method also includes identifying additional tactical lanes from the tactical map based on proximity to the matching tactical lanes and adding the additional tactical lanes to the matching tactical lanes. In some implementations of the method, determining the second route is performed using a routing algorithm that excludes the tactical lanes from the tactical map that are not included in the matching tactical lanes.

Another aspect of the disclosed embodiments is a non-transitory computer-readable storage device including program instructions executable by one or more processors that, when executed, cause the one or more processors to perform operations. The operations include determining a base route from a first location to a second location using a base map, wherein the base map includes base segments that are described as polyline segments, and the base route includes a series of the base segments from the base map. The operations also include determining route points that correspond geometrically to locations of the series of the base segments such that the route points extend along the base route, and matching tactical segments from a tactical map to the route points to identify matching tactical segments based on a distance between the tactical segments and the route points. The operations also include matching, for each of the tactical segments, one or more tactical lanes to the route points to identify matching tactical lanes, wherein each of the tactical lanes is a portion of a corresponding one of the tactical segments. The operations also include determining a second route from the first location to the second location using the matching tactical lanes, wherein the second route is constrained to the matching tactical lanes and the second route includes a series of the tactical lanes from the matching tactical lanes.

Another aspect of the disclosed embodiments is a system that includes a memory and a processor configured to execute instructions stored. The instructions cause the processor to determine a base route from a first location to a second location using a base map, wherein the base map includes base segments that are described as polyline segments, and the base route includes a series of the base segments from the base map. The instructions also cause the processor to determine route points that correspond geometrically to locations of the series of the base segments such that the route points extend along the base route, and match tactical segments from a tactical map to the route points to identify matching tactical segments based on a distance between the tactical segments and the route points. The instructions also cause the processor to match, for each of the tactical segments, one or more tactical lanes to the route points to identify matching tactical lanes, wherein each of the tactical lanes is a portion of a corresponding one of the tactical segments. The instructions also cause the processor to determine a second route from the first location to the second location using the matching tactical lanes, wherein the second route is constrained to the matching tactical lanes and the second route includes a series of the tactical lanes from the matching tactical lanes.

DETAILED DESCRIPTION

The disclosure herein is directed to constrained registration of map information. The techniques disclosed herein can be used in a route registration process, by which a route that was created using a first map is compared to a second map with different features to generate a representation of the route on the second map.

The tasks of generating a route and displaying a route to a user in the form of turn-by-turn instructions can be performed using two different maps. In this disclosure, a first map that is utilized for the task of generating the route is referred to as a base map, and a second map that is utilized for the task of displaying the route to the user is referred to as a tactical map. The terms "base" and "tactical" are utilized for explanatory purposes, and are not intended to be limiting.

The base map and the tactical map differ in terms of how roadways or paths are represented, and in the types of annotation information included in each of the map. The geometric representations of the same roadways or paths can differ between the two maps, as a result of differing digitization techniques, errors, and changes that have been made to the roadways or paths that are incorporated in reflected in one of the maps but not the other. The base map and the tactical map can also differ in resolution (e.g., segment length), can differ as to whether individual travel lanes are included, and can differ as to whether routing cost information is included. For instance, the base map can represent roadway segments at a low resolution, but include detailed routing cost information, while the tactical map can be a "high definition" map that represents roadway lanes and roadway segments at a high resolution, while including limited routing cost information or no routing cost information.

In the systems and methods described herein, a base route is determined using the base maps. The base route can be represented, for example, as an ordered group of segments from the base map. Points are defined along the base route, and each of these points is matched to one or more matching segments from the tactical map based on a set of constraints. A routing algorithm is run on only the matching segments from the tactical map to generate a connected route from the starting point to the ending point on the tactical map. If needed the process can be iterated over tolerance values and algorithm parameters if needed to generate a connected route. If a connected tactical route is obtained by this process, the result is necessarily one that lies within the tolerance limits and constraints utilized to determine the matching segments from the base map.

Figure 1:
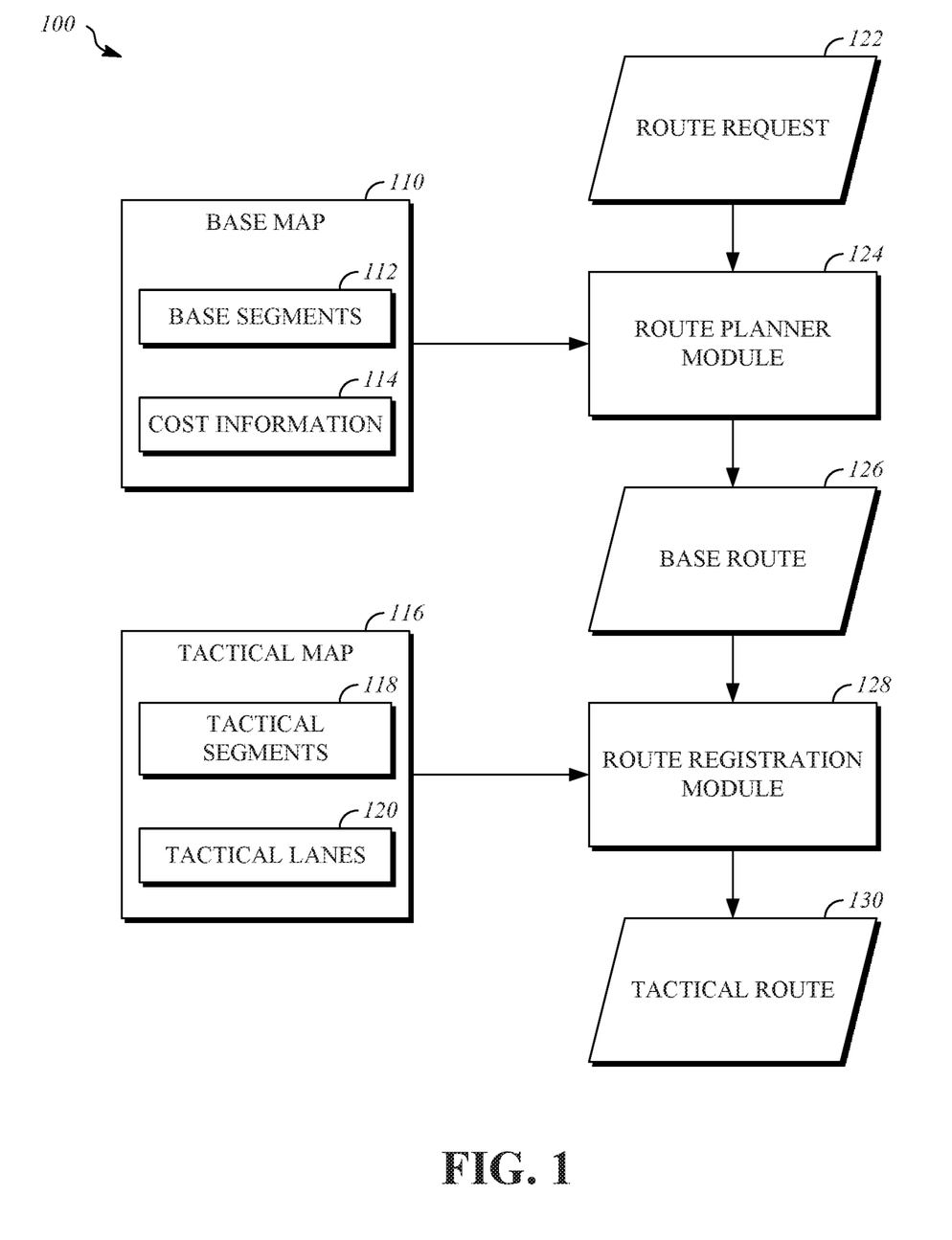
FIG. 1 is a block diagram that shows a routing system.

FIG. 1 is a block diagram that shows a routing system 100. The routing system 100 may be implemented, in part, using one or more computing devices. As an example, suitable computing devices for use in implementing the routing system 100 can include a memory, a processor, and program instructions that are stored in the memory and cause the processor to perform actions when executed. The routing system 100 can be implemented using a single computing device or using multiple computing devices that communication by sending and receiving information using wired or wireless communications systems.

The routing system 100 includes a base map 110. The base map 110 includes mapping information that describes features of an environment, such as geographic features. The base map 110 includes base segments 112. The base segments 112 are incorporated in the base map 110 in the form of information that describes segments of a transportation network, inclusive of roadway segments and pathway segments. The base segments 112 can be described geometrically as segments of a polyline, where each segment of the polyline represents part of a roadway, for example, inclusive of all lanes of travel in at least one direction. In some implementations, the base map 110 and the base segments 112 do not include information that describes individual roadway lanes on roadways that include multiple lanes of travel for one direction of travel.

Each of the base segments 112 can be described in terms of location, directionality, and connections to other ones of the base segments 112. As an example, each of the base segments 112 can be described by beginning and ending points having locations expressed in a coordinate system, such as latitude, longitude, and elevation. The directionality of each of the base segments 112 indicates permissible directions of travel, such as northbound only, southbound only, or northbound and southbound. Connectivity to other segments can be described, for each of the base segments 112, by unique identification codes that indicate the adjacent segments. The base map 110 also includes cost information 114. The cost information 114 is information that is used for route planning, and indicates the desirability of utilizing each of the base segments 112 in a route. The cost information 114 can include, as examples, speed limit information, traffic information, and travel time information.

The routing system 100 includes a tactical map 116. The term "tactical" refers to the incorporation of features in the tactical map 116 that allow route decisions to be made at a lane level on a multilane roadway. To allow lane-level decisions, the tactical map includes tactical segments 118 that each include one or more tactical lanes 120. The tactical segments 118 are map information that is included in the tactical map 116 to describe a portion of a roadway, inclusive of all roadway lanes for one direction of travel. The tactical lanes 120 are map information that is included in the tactical map to describe individual roadway lanes.

The tactical segments 118 are incorporated in the tactical map 116 in the form of information that describes segments of a transportation network, inclusive of roadway segments and pathway segments. Each of the tactical segments 118 can be described in terms of location, directionality, and connections to other ones of the tactical segments 118. As an example, each of the tactical segments 118 can be described geometrically as a polyline segment having beginning and ending points having locations expressed in a coordinate system, such as latitude, longitude, and elevation. The directionality of each of the tactical segments 118 indicates permissible directions of travel, such as northbound only, southbound only, or northbound and southbound. Connectivity to other segments can be described, for each of the tactical segments 118, by unique identification codes that indicate the adjacent segments. The tactical lanes 120 describe the roadway lanes that are present in each of the tactical segments 118, including directionality and connectivity of each lane with other lanes in the respective one of the tactical segments 118.

In some implementations, the tactical lanes 120 of the tactical map 116 may be represented at the root level of the tactical map 116, and not be grouped into the tactical segments 118. In such an implementation, operations described in this application as being performed at a segment level are instead performed at a lane level, using the tactical lanes 120.

Portions of the base map 110 and the tactical map 116 describe the same features. As an example, a subset of the base segments 112 and a subset of the tactical segments 118 can describe the same section of a roadway. The information included in the tactical map 116 and the base map 110 is, however, different. As one example, the beginning and ending points of the base segments 112 and the beginning and ending points of the tactical segments 118 may be at different longitudinal positions along the roadway, owing to differences in map digitization methods, different spatial resolutions used for defining map segments during digitization, and different errors made when digitizing each of the base map 110 and the tactical map 116. Thus, the base segments 112 and the tactical segments 118 may not be co-located and/or the same roadway may be partitioned into segments differently leading to different starting and ending points for the base segments 112 and the tactical segments 118.

The base map 110 and the tactical map 116 also differ in their informational content. In the described example, the base map 110 includes the cost information 114 and the tactical map 116 does not include information describing costs that can be used for route planning, or alternatively, includes a less extensive set of cost information. Also in the described example, the base map 110 has a segment-level resolution that does not include lane information, while the tactical map has a lane-level resolution that does include lane information.

Figure 2A:
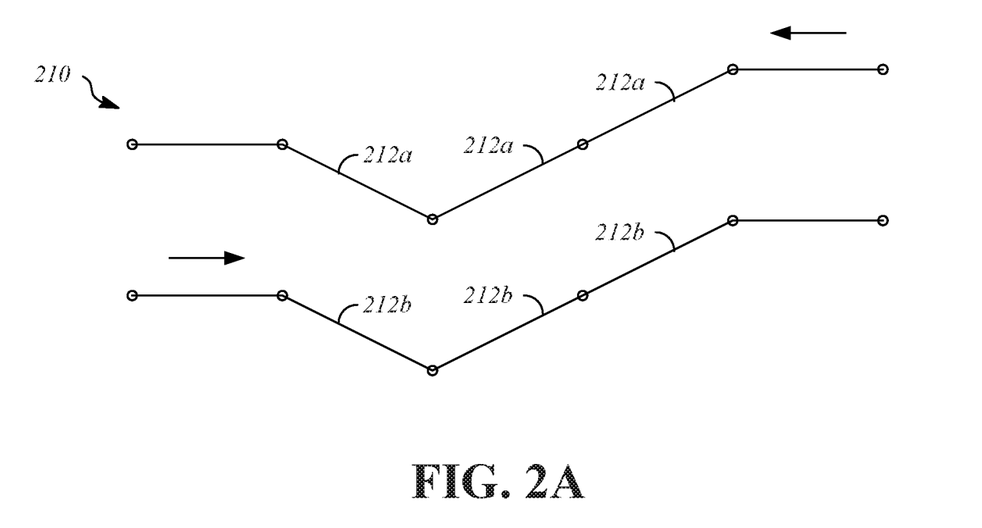
FIG. 2A is an illustration showing an example of a base map.

FIG. 2A is an illustration showing an example of a base map 210. The base map 210 includes a first group of base segments 212a that correspond to a first direction of travel on a roadway. The base map 210 also includes a second group of base segments 212b that correspond to a second direction of travel on the roadway. In the illustrated example, the base map 210 represents a roadway that has two lanes of travel in each direction. However, lane-level information is not included in the base map 210.

Figure 2B:
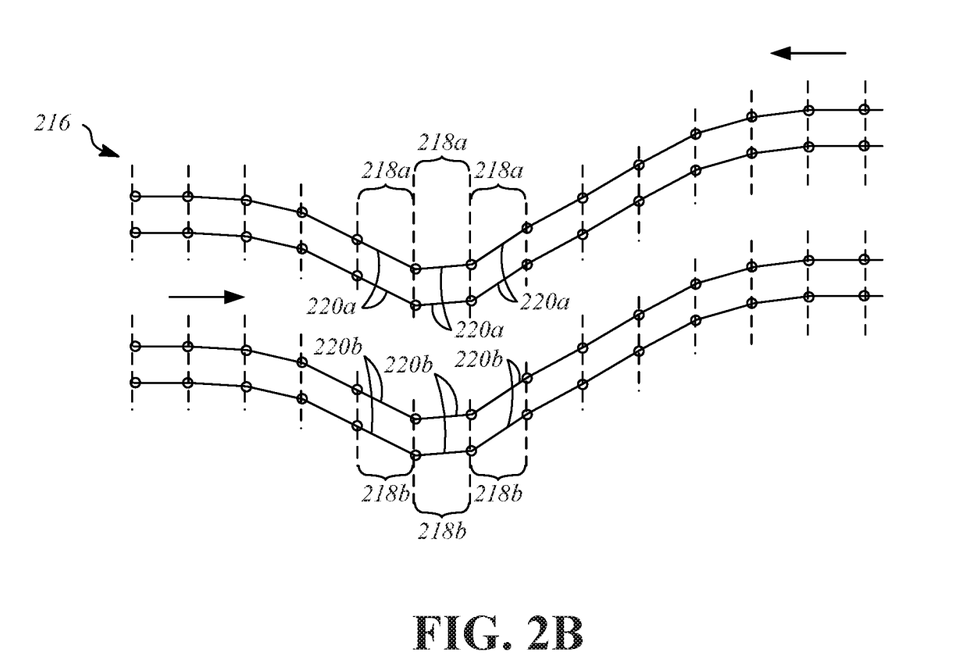
FIG. 2B is an illustration showing an example of a tactical map.

FIG. 2B is an illustration showing an example of a tactical map 216. The tactical map 216 represents the same area of roadway that is represented by the base map 210, with the roadway having two lanes of travel in each direction. The tactical map 216 differs from the base map 210 in that lane-level information is included in the tactical map 216. In particular, the tactical map 216 includes a first group of tactical segments 218a that correspond to the first direction of travel on the roadway. The tactical segments 218a each include multiple tactical lanes 220a. The tactical map 216 includes a second group of tactical segments 218b that correspond to the first direction of travel on the roadway. The tactical segments 218b each include multiple tactical lanes 220b. In addition to inclusion of the tactical lanes 220a, 220b, the tactical map 216 also differs the base map 210 in that the tactical segments 218a, 218b have shorter lengths that the base segments 212a, 212b, resulting in higher spatial resolution for the tactical map 216.

With further reference to FIG. 1, the routing system 100 is able to receive a route request 122 as an input to a route planner module 124. The route request 122 can describe a starting point and an ending point for a trip. In some situations, the route request 122 may describe only an ending point, with the current location of the system requesting the route (e.g. a mobile device) being the assumed starting point. Intermediate points may also be specified, to constrain the route such that it passes through the intermediate points. The route request 122 may or may not include additional directives that constrain route planning in some manner, such as a directive to avoid limited-access freeways, a directive to use a certain route, a directive to minimize consumption of fuel or electricity, or a directive to minimize travel time. The route request 122 can originate from an external source that is not part of the routing system 100. As one example, the route request 122 may originate from a human in the form of a verbal command, a text input, or selection of a location on a map using a handheld input device or a touchscreen input device.

The route planner module 124 is operable to generate a base route 126 as an output. The base route 126 describes series or roadways and/or paths that can be used to travel from the starting point to the destination, as designated by or determined based on the route request. For example, the base route 126 can be expressed as a series of the base segments 112 from the base map 110, with the series beginning with or near the starting point and ending with or near the destination point. In some implementations, the base map 110 does not include lane-level information, and instead, the base segments describe a portion of roadway in a direction of travel without including information that specifies a particular roadway lane.

The route planner module 124 determines the base route 126 using the base map 110, including the base segments 112 and the cost information 114. According to well-known pathfinding algorithms, such as A* or Dijkstra's algorithm, the route planner module 124 can define the base route as a series of the base segments 112, extending from the starting point to the destination. In most scenarios, more than one valid route can be determined by the route planner module 124 for travel from the starting point to the destination point. To select a route from multiple valid routes, an optimization process is used, such as by using the cost information 114 to determine a cost associated with each of the multiple valid routes, and the valid route having the lowest cost associated with it can be utilized as the base route 126.

The routing system 100 includes a route registration module 128 that receives the base route 126 as an input. The route registration module 128 is operable to compare the base route 126 to the tactical map 116 and generate a tactical route 130 as an output. The tactical route 130 is equivalent to the base route 126, in that the starting point and the destination point are the same and, to the extent possible in light of differences between the tactical map and the base map 110, the same roadways and roadway segments are utilized to define the routes.

The base route 126 cannot be directly transferred to the tactical map 116, as there typically will not be an unambiguous one-to-one correspondence between the base segments 112 of the base map 110 that are included in the base route 126 and the tactical segments 118 of the tactical map 116. Instead, the base map 110 and the tactical map 116 may differ both geometrically and topologically. As one example, for a given section of roadway that positions and endpoints of the base segments 112 and the positions and extents of the tactical segments 118 will differ, and the section of roadway may be represented by fewer of the tactical segments 118 as compared to the base segments 112. As another example, the tactical segments 118 include the tactical lanes 120, which can be designated for use as part of the tactical route 130, while the base segments 112 do not include lane information. Because of these differences, the route registration module 128 is operable to identify a subset of the tactical segments 118 that are near the base route 126 and determine the tactical route 130 using the subset of the tactical segments 118.

Figure 3:
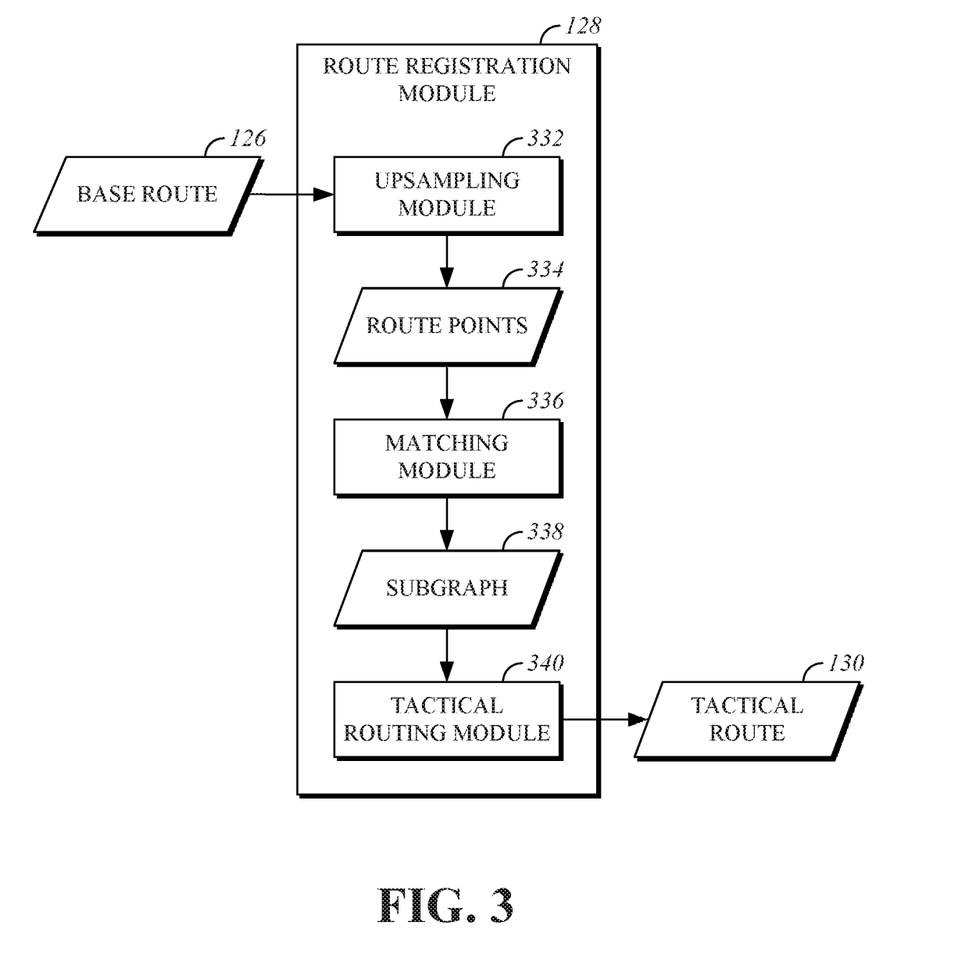
FIG. 3 is a block diagram that shows a route registration module.

FIG. 3 is a block diagram that shows the route registration module 128. The route registration module 128 includes an upsampling module 332. The upsampling module 332 processes the base route 126 to identify locations that correspond to the base segments 112 that are included in the base route 126. The upsampling module 332 can identify route points 334, which are points in three-dimensional space (e.g., latitude, longitude, and elevation) that correspond to the base segments 112 that are included in the base route 126. The route points 334 are determined based on the geometry and three-dimensional positions of a corresponding segment from the base segments 112, such as by interpolating along the length of the corresponding segment. The route points 334 can be generated according to a desired resolution to produce multiple points for each of the base segments 112 that are included in the base route 126. As one example, the route points 334 can be generated along the length of each of the base segments 112 in the base route 126 at a spacing that is approximately one half of a width of a travel lane on a typical roadway. Other resolutions can be utilized to generate the route points. Upsampling is performed for all of the base segments 112 that are included in the base route 126. The route points 334 can represent the base route in the form of, for example, a point cloud.

Figure 4:
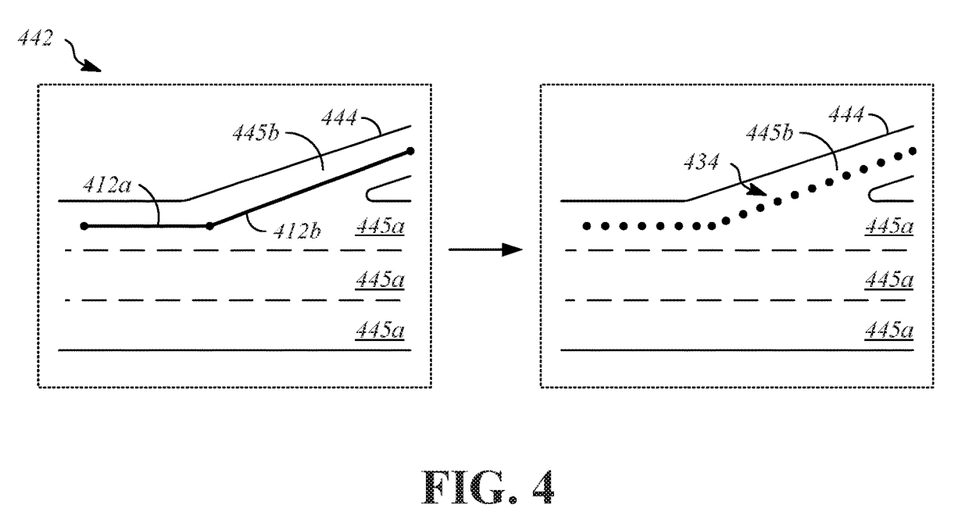
FIG. 4 is an illustration that shows an example of operation of the route registration module.

FIG. 4 is an illustration that shows an example 442 of operation of the route registration module 128 in which a first base segment 412a and second base segment 412b are shown with respect to a roadway 444 that includes through lanes 445a and an on-ramp lane 445b. The first base segment 412a corresponds to travel on the through lanes 445a of the roadway 444, and the second base segment 412b corresponds to travel on the on-ramp lane 445b of the roadway. Processing by the upsampling module 332 converts the first base segment 412a and the second base segment 412b into route points 434.

With further reference to FIG. 3, the route registration module 128 includes a matching module 336 that receives the route points 334 as an input. The matching module 336 also utilizes the tactical map 116, and compares the route points 334 to the tactical map 116 to identify portions of the tactical map 116 that correspond to the base route 126, as represented by the route points 334.

The matching module 336 uses the route points 334 that were generated by the upsampling module 332 to build a subgraph 338 of the tactical map 116 that includes all of the tactical segments 118 that contain at least one point from the route points 334. As will be explained herein, the subgraph 338 can be expanded to include its connected neighbors up to a predetermined depth (i.e., number of segments away) from the tactical map 116. The graph connectivity of the subgraph 338 is based on connectivity of the tactical segments 118 and optionally on lane-level transition information, for example, as described by the tactical lanes 120, if lane-level transition information is available.

The matching module 336 first matches the route points 334 to the tactical segments 118 of the tactical map 116. For each of the route points 334, all of the tactical segments 118 that are within a threshold distance are considered to be potential matches to the base route 126. Thus, if the distance between any point from the route points 334 and a particular segment from the tactical segments 118 is less than a threshold value, that segment is added to a set of potentially matching segments. The distances between the route points 334 and the tactical segments 118 can be measured in three dimensions to account for, as an example, overlapping roadways that are disposed at different elevations along a similar alignment.

The potentially matching segments from the tactical segments 118 are compared to the base route 126 for colinearity. The comparison can be made relative the route point 334 that identified the specific one of the tactical segments 118 as a potential match, in that it can be compared to the base segment 112 that the route point 334 was sampled from. Checking for colinearity between the tactical segments 118 and corresponding segments of the base segments 112 from the base route 126 ensures that the tactical segments 118 that are being matched to the base route 126 extend in roughly the same direction as the base route 126, and represent travel in the same direction (e.g. northbound segments should not be matched to southbound segments). If an angle along which a potentially matching segment from the tactical segments 118 extends differs by more than a threshold value from an angle along which a corresponding one of the base segments 112 from the base route 126 extends, then that segment can be excluded from the set of potentially matching segments on the basis that the tactical segment 118 being analyzed does not match the base route 126.

Additional criteria and types of information can be utilized as a basis for determining whether one of the potentially matching segment from the tactical segments 118 matches the base route 126. As one example, where an initial match is determined based on relative distances in two dimensional space, elevation of the tactical segments relative to portions of the base route 126 can be considered independent of the two-dimensional distance to exclude potential matched if there is an elevational mismatch. As another example, road type information can be utilized to exclude potential matches if there is a type mismatch between the tactical segments 118 and the base segments 112 from the base route 126. One example of road type information is referred to as "form of way," which refers to physical and traffic properties of a roadway. As another example, real-time measurements can compare portions of potentially matching segments from the tactical segments 118 and the base segments 112 and exclude non-matching segments.

For each matching segment from the tactical segments 118, one or more lanes from the tactical lanes 120 are identified as matching lanes. Matching lanes can be identified by the positions of the route points 334 relative to the tactical lanes. If one of the route points 334 is located within the extents of one of the tactical lanes 120, it is identified as a matching lane and is added to a subgraph 338. This comparison can be made without consideration of the elevational direction, by making the comparison in two-dimensional coordinate space such as a latitude and longitude coordinate space or an x and y coordinate space.

The subgraph 338 can be expanded to include lanes in addition to those that match the route points 334 by virtue of the route points 334 being located within the extents one of the tactical lanes 120. The additional lanes may be located in the previously matched segment from the tactical segments 118, or from one of the tactical segments 118 that was not previously identified as a matching segment. For each of the matching lanes, the subgraph 338 can be expanded, such as by adding a certain number of adjacent lanes (e.g. one lane in either direction of the matching lane) to the subgraph 338. Alternatively, for each of the route points 334, additional lanes within a threshold distance of the route points 334 can be added to the subgraph 338. Other techniques can be used to add additional lanes from the tactical lanes 120 to the subgraph 338.

The subgraph 338 is an output that is generated by the matching module 336. The subgraph 338 identifies tactical segments 118 and tactical lanes 120 that potentially match the base route 126. The tactical segments 118 and the tactical lanes 120 that are included in the subgraph 338 are a subset of the tactical segments 118 and the tactical lanes 120 that are included in the tactical map 116.

Figure 5:
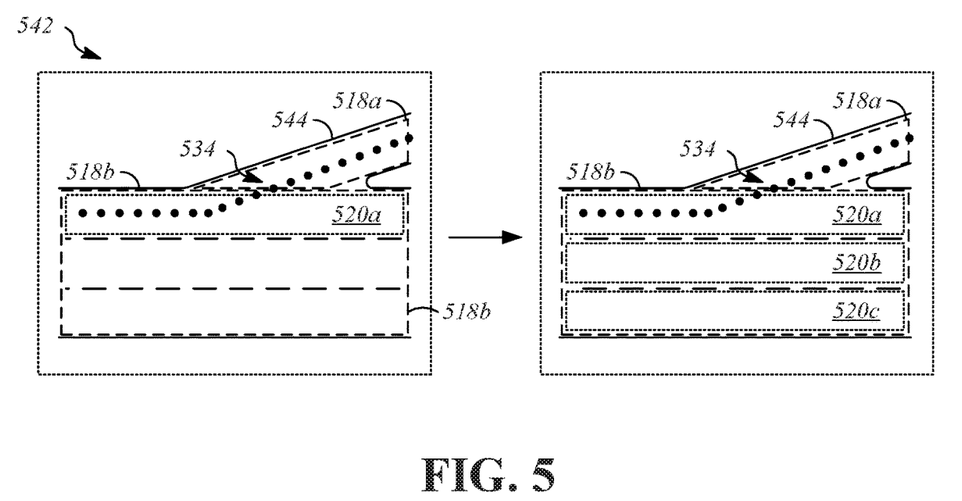
FIG. 5 is an illustration that shows an example of operation of a matching module.

FIG. 5 is an illustration that shows an example 542 of operation of the matching module 336 applied to a portion of a roadway 544. In the example 542, a first tactical segment 518a and a second tactical segment 518b are identified as matching based on the presence of route points 534 within them. In the second tactical segment 518b, a first tactical lane 520a is identified as matching based on the presence of the route points 534 within the first tactical lane 520a. The set of matching segments and/or lanes is then augmented, and one or both of a second tactical lane 520b and a third tactical lane 520c are added to the set of matching segments and/or lanes.

With further reference to FIG. 3, the route registration module 128 also includes a tactical routing module 340 that receives the subgraph 338 as an input. The tactical routing module 340 attempts to generate a valid route on the tactical map 116 from the starting point to the destination point using only the tactical lanes 120 that are included in the subgraph 338. The tactical routing module 340 can utilize well-known pathfinding algorithms, such as A* or Dijkstra's algorithm, to generate a route from the starting point to the destination point using the subgraph 338. The routing performed such by the tactical routing module 340 can utilize cost information. Since the subgraph 338 by construction represents only a fraction of the tactical map 116, and is linearly arranged along the base route 126, the expected running time of such routing procedure can be approximated as a function of the number of nodes present in the subgraph 338. Thus, a limited set of cost information, such as the number or segments traversed or the length of segments traversed may be utilized by the tactical routing module 340. The cost information can also apply a nominal penalty for lateral lane changes in order to constrain unnecessary lane changes.

The resulting route can be expressed in terms of a series of the tactical segments 118 from the tactical map 116, along with information specifying which of the tactical lanes 120 are permitted or preferred for use within each of the tactical segments 118.

A determination is made as to whether the tactical routing module 340 has generated a valid route from the subgraph 338. As an example, a route can be considered valid when it is able to connect the starting point and the destination point by a connected series of the tactical segments 118 and the tactical lanes 120. If the tactical routing module 340 has generated a valid route from the subgraph 338, the resulting route is output as the tactical route 130. It may be the case that the tactical routing module 340 will be unable to generate a valid route from the starting point to the destination point, such as if there is no series of the tactical segments 118 from the subgraph 338 that connect the starting point and the destination point. If the tactical routing module fails to generate a valid route, an additional iteration of matching is performed by the matching module 336 with relaxed constraints, such as be increasing the degree by which the subgraph 338 is augmented to include segments and lanes that are located near the tactical segments 118 and the tactical lanes 120 that are initially located using the locations of the route points 334. Using relaxed constraints, a greater number of the tactical segments 118 and the tactical lanes 120 of the tactical map 116 will be included in the subgraph 338, which is updated by the matching module 336 and returned to the tactical routing module 340 for processing. Multiple iterations can be performed, if needed, until a valid route is generated and output as the tactical route 130. As the result of this process, the tactical route 130 will necessarily be a valid route that connects the starting point to the destination point, lies within tolerance limits of the base route 126, and complies with connectivity constraints for the tactical map 116.

Figure 6:
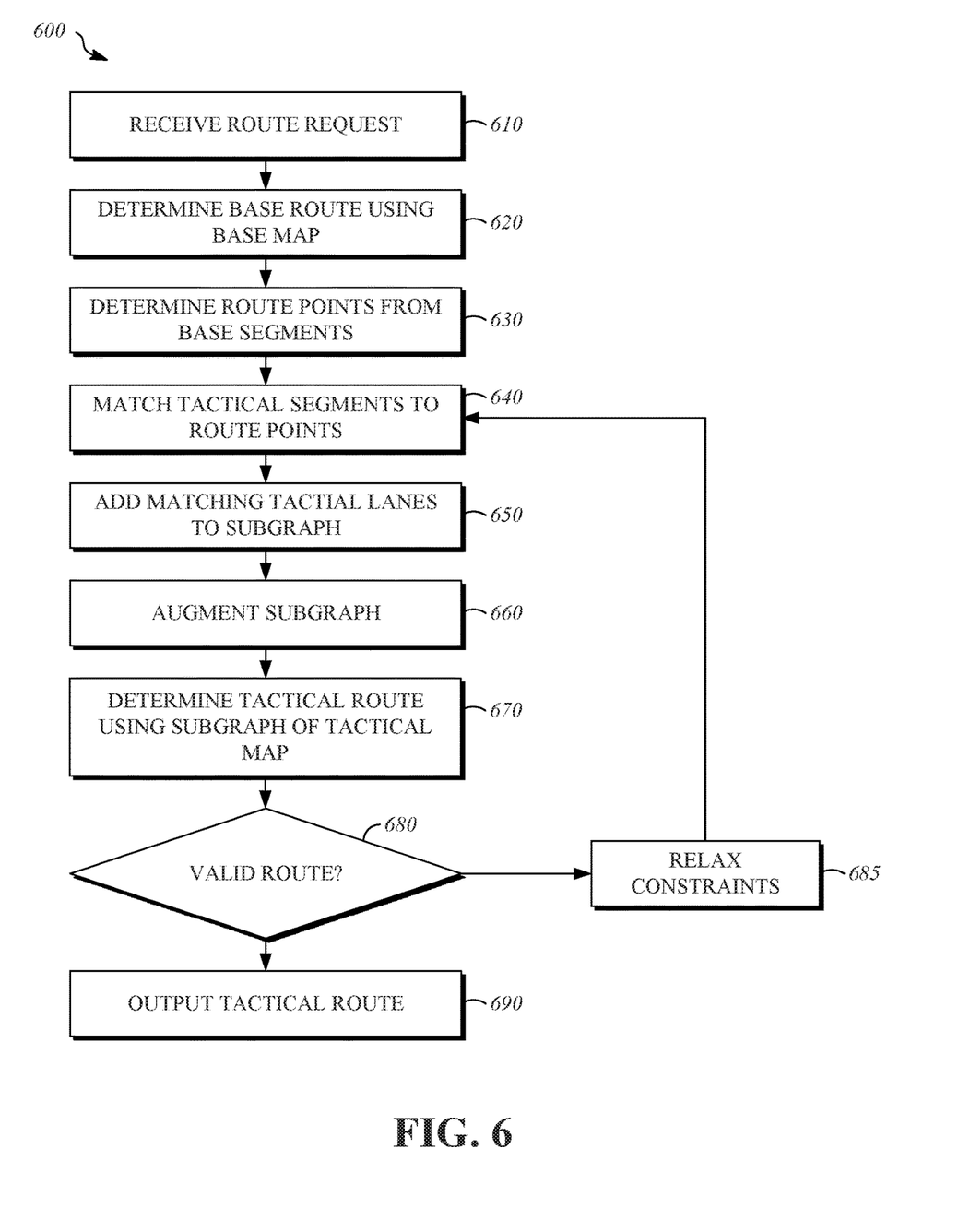
FIG. 6 is a flowchart that shows an example of a process for constrained registration of map information.

FIG. 6 is a flowchart that shows an example of a process 600 for constrained registration of map information. The process 600 can be performed using the routing system 100, and operations of the process can be caused, controlled, or performed by a computing device. The computing device is provided with instructions that are stored in a storage device or a memory device, and a processor that is operable to execute the program instructions. When executed by the processor, the program instructions cause the computing device to perform the operations of the process 600 as described herein.

The route request 122 is received in operation 610. The route request 122 can be in any form that can be interpreted to determine an intention of the user or system that generated the route request 122. As previously described, the route request 122 can specify a starting point and a destination point or ending point.

The base route 126 is determined in operation 620. The base route 126 may also be referred to herein as a first route. The base route 126 is determined such that it fulfills the route request 122, such as by allowing successful navigation from a first location to a second location by following the base route 126. The base route 126 is determined using a first map, such as the base map 110, by identifying a series of map elements from the base map 110, such as the base segments 112. Determining the base route 126 can include determining a series of the base segments 112 that connect the starting point indicated by the route request 122 to a destination point or ending point indicated by the route request 122. The base route 126 can be determined in the manner described with respect to the route planner module 124, such as by using a routing algorithm that determines an optimal route from the first location to the second location using a cost function.

At operation 630, the route points 334 are determined from the base segments 112. Any suitable geometric technique can be utilized to determine the route points 334 from the base segments 112. In implementations where the base segments 112 are upsampled to determine the route points 334, the route points 334 can be placed along the base segments 112 at a predetermined spacing, or the route points 334 can be formed in a predetermined three-dimensional pattern (e.g., a "cloud") around the base segments 112. As one example, the base segments 112 can include polyline segments and route points that are associated with the base segments 112 can be sample from the polyline segments. Operation 630 can be performed in accordance with the description of the upsampling module 332.

Matching is performed with respect to a second map, such as the tactical map 116, using second map elements including the tactical segments 118 and the tactical lanes 120. At operation 640 the tactical segments 118 from the tactical map 116 are compared to the route points 334 to match the route points 334 to the tactical segments 118. As one example, the route points 334 can be matched to the tactical segments 118 based on presence within a respective two-dimensional area corresponding to each of the tactical segments 118. As another example, the route points 334 can be matched to the tactical segments 118 based on presence within a respective three-dimensional area corresponding to each of the tactical segments 118. As another example, the route points 334 can be matched to the tactical segments 118 based on a distance between each route point 334 and a respective one of the tactical segments 118 being less than a threshold distance. As previously described, matching the tactical segments 118 in operation 640 can be based on constraints such as the threshold distances applied when determining whether one of the tactical segments 118 matches the route points 334.

In operation 650, for each of the tactical segments 118 that were identified as matching the route points 334 in operation 640, one or more tactical lanes 120 can be identified as matching based on, as examples, presence of the route points within a two-dimensional or three-dimensional area for each of the tactical lanes 120, or a distance from the route points 334 to each of the tactical lanes 120 being less than a threshold distance. The matching lanes from the tactical lanes 120 are added to the subgraph 338. As previously described, matching the tactical lanes 120 in operation 640 can be based on constraints such as the threshold distances applied when determining whether one of the tactical lanes 120 matches the route points 334.

To relax the constraints placed on this process, additional map elements such as the tactical segments 118 and the tactical lanes 120 can be identified based on proximity to the base route 126 and/or the route points 334 and added to the subgraph 338. In particular, in operation 660 the subgraph 338 can be expanded to include additional segments that are connected to or adjacent to the tactical segments 118 that were identified as matching in operation 640 and/or additional lanes that are connected to or are adjacent to the tactical lanes 120 that were identified as matching in operation 650. Expanding the subgraph 338 in operation 660 can be performed at a desired depth level. The term "depth level" describes creation of a group of elements by starting at a root element and including elements that are connected to the root element by a number of connections equal to the depth level. Thus, expanding the subgraph 338 with a depth level equal to one expands the subgraph 338 by using the tactical segments 118 and the tactical lanes 120 as root elements, and adding segments and/or lanes that are directly connected to the subgraph 338. Expanding the subgraph 338 with a depth level equal to two uses the tactical segments 118 and the tactical lanes 120 as root elements, and adds segments and/or lanes that are directly connected to or adjacent to the root elements as well as segments and/or lanes that are connected to the root elements by one intervening segment and/or lane.

Matching in operation 640, operation 650, and operation 660 can be performed in accordance with the description of the matching module 336. In some implementations, matching includes comparing locations for the base segments 112 from the base route 126 to locations for the tactical segments 118. In some implementations, matching includes comparing locations for the base segments 112 from the base route 126 to locations for the tactical lanes 120.

In some implementations, matching includes comparing locations of the base segments 112 to locations of the tactical segments 118 and/or the tactical lanes 120. In some implementations, matching includes comparing a distance between the base segments 112 from the base route 126 and the tactical segments 118 and/or the tactical lanes 120 to a threshold distance. In some implementations, matching includes comparing elevation information for the base segments 112 from the base route 126 to elevation information for the tactical segments 118 and/or the tactical lanes 120. In some implementations, matching includes comparing road type information for the base segments 112 from the base route 126 to road type information for the tactical segments 118 and/or the tactical lanes 120.

The process 600 can be implemented such that operation 650 is omitted. In an implementation that omits operation 650, the subgraph 338 is built at the segment level, by adding matching segments from the tactical segments 118 of the tactical map 116 to the subgraph 338 as opposed to building the subgraph 338 at the lane level using the tactical lanes 120 as in operation 650.

In operation 670 the tactical route 130, which is also referred to herein as a second route, is determined using the subgraph 338 of the tactical map 116. The tactical route 130 is determined using only the tactical segments 118 and/or the tactical lanes 120 that are included in the subgraph 338 of the tactical map 116, and excludes use of map elements such as the tactical segments 118 and the tactical lanes 120 that are not included in the subgraph 338. The tactical route 130 can be determined by identifying a series of the tactical segments 118 and/or the tactical lanes 120 from the subgraph 338 that fulfill the route request 122, such as a series of the tactical segments 118 and/or the tactical lanes 120 that connect the starting point indicated by the route request 122 to a destination point or ending point indicated by the route request 122. The tactical route 130 can be determined in the manner described with respect to the tactical routing module 340.

In operation 680 a determination is made as to whether a valid route was generated as the tactical route 130 in operation 670. Validity of the tactical route 130 can be determined in the manners previously described, for example, by confirming that the tactical route 130 includes a series of the tactical segments 118 and or the tactical lanes 120 that can be traversed in order from the starting point to the destination point without violating constraints, such as the required directions of travel for each of the segments and lanes. If no route was generated in operation 670 or if the route generated in operation 670 is not valid, the process proceeds to operation 685. In operation 685, constraints used for matching portions of the tactical map 116 to the base route 126 are relaxed, and the process returns to operation 640 for an additional iteration of route registration. If a valid route was generated for the tactical route 130 in operation 680, the process continues to operation 690, where the tactical route 130 is output in a manner that can be stored, displayed, or interpreted and used by another system.

Figure 7:
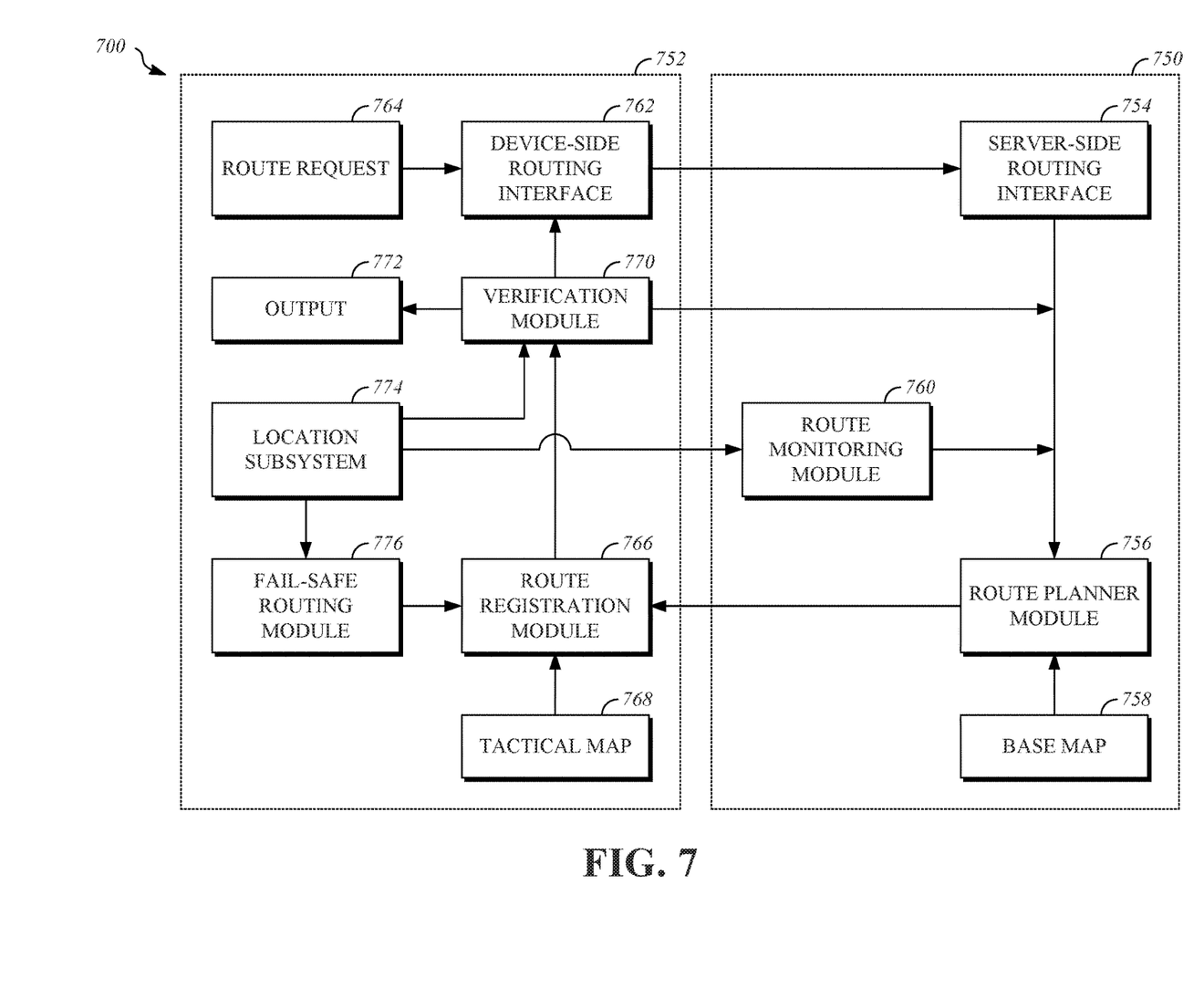
FIG. 7 is a block diagram that shows a routing system that includes a server and a device.

FIG. 7 is a block diagram that shows a routing system 700 that includes a server 750 and a device 752. The server 750 and the device 752 are able to communicate by using any suitable communications protocol or interface, including wireless communications and wired communications. The server 750 can be located remotely from the device 752, and the server may be disposed at a fixed location (i.e., not part of a mobile apparatus). The device 752 may be a mobile apparatus of any type. As one example, the device 752 may be a mobile computing device, such as a smart phone, that is configured to display navigation information to a user and is provided with and executes software that allows it to function as part of the routing system 700. As another example, the device 752 may be a computing device that is incorporated in a vehicle information system that is configured to display navigation information to a user and is provided with and executes software that allows it to function as part of the routing system 700. As another example, the device 752 may be a computing device that is incorporated in an automated vehicle control system and is provided with and executes software that allows it to function as part of the routing system 700.

The server 750 includes a server-side routing interface 754. The server-side routing interface 754 is configured to receive communications from the device 752, such as route requests that include information regarding an intended route, such as a starting point and a destination point. The server-side routing interface 754 can implement an application programming interface (API) that specifies formats for communications that are received from the device 752 and actions to be performed by the server 750 in response to those communications.

The server 750 includes a route planner module 756 that receives information, such as the route requests, from the server-side routing interface 754. The route planner module 756 can, for example, generate a base route, from a starting point to a destination in response to the route request. The base route generated by the route planner module 756 is generated using a base map 758, which is analogous to the base map 110. Subsequent to generation of the base route, the route planner module 756 can transmit the base route to the device 752. The functionality and implementation of the route planner module 756 is analogous to that of the route planner module 124.

The server 750 includes a route monitoring module 760. The route monitoring module 760 is operable to receive information from the device 752 describing operation of the device 752. The information received by the route monitoring module 760 from the device 752 can include information describing the current location of the device 752. The information describing the current location of the device 752 can be used to monitoring movement of the device 752 and compare that movement to expected movement of the device 752. The information received by the route monitoring module 760 from the device 752 can also describe decisions made by the device 752, such as decisions regarding route registration.

The device 752 includes a device-side routing interface 762. The device-side routing interface 762 is configured to second communications to the server 750. As an example, the device 752 can receive a route request 764 from a user input or from another system, and transmit the route request to the server 750 via the server-side routing interface 754. The route request 764 can include a starting point and a destination point. The route request 764 can be analogous to the route request 122, as previously described.

The device 752 includes a route registration module 766 that is operable to receive the base route from the route planner module 756, where the base route is described using the base map 758, such as in the form of a series of base segments from the base map 758. The route registration module 766 is analogous to the route registration module 128, and compares the base route to a tactical map 768, which is analogous to the tactical map 116. In a manner analogous to the processing described with respect to the route registration module 128, the route registration module 766 generates a tactical route that is described using portions of the tactical map 768. For example, the tactical route can be described as a series of tactical segments from the tactical map 768.

The tactical map 768 is passed to a verification module 770, which determines whether the tactical route is valid. The tactical route can be reevaluated if it is not valid, as previously described. If the tactical route is valid, it can be transmitted or displayed as an output 772 for use, as examples, by a human user or by an automated system, for navigational purposes including causing movement of the device 752 from the starting point to the destination point.

Upon determining that a tactical route is invalid, the verification module 770 can transmit information describing the invalid condition and/or the causes of the invalid condition to the route planner module 756. As an example, the verification module 770 can determine that certain tactical segments are not available for use (e.g., due to a road closure), identify base segments that correspond to the unavailable tactical segments using information describing correspondence between the tactical segments and the base segments from the route registration process, and transmit information describing the unavailable base segments to the route planner module 756. The route planner module 756 can avoid use of these base segments for further routing operations, such as by maintaining an exclusion list that identifies base segments that are not available for use.

Motion of the device 752 is monitored by a location subsystem 774. The location subsystem 774 is operable to output information that describes the current location of the device 752 using any suitable method or technologies. As an example, the location subsystem 774 can use a satellite-based location tacking system such as the Global Positioning System (GPS). The location subsystem 774 can transmit the location information to the route monitoring module 760 of the server 750, where the location information is tracked, and the base route is updated by the route planner module 756 as needed, such as if the device 752 deviates from the base route. The location subsystem 774 can also transmit the location information to the verification module 770, which can verify that the device 752 is following the tactical route and take action if needed.

The device 752 includes a fail-safe routing module 776 that determines a fail-safe tactical route using the tactical map 768 under conditions where the base route is not available or the base route cannot be followed. The fail-safe tactical route may also be referred to herein as a third route.

The fail-safe routing module 776 can output the fail-safe tactical route when no base route is received from the server 750. As an example, the verification module 770 can determine that no base route has been received, and cause the fail-safe routing module 776 to determine the fail-safe tactical route from a current location of the device 752 to the destination as indicated by the route request 764. The fail-safe routing module 776 can determine the fail-safe tactical route using the tactical map 768 using conventional pathfinding techniques with segments lengths as cost factors, as previously described. The device 752 can continue using the fail-safe routing module 776 to generate the fail-safe tactical route as the output 772 until the server 750 resumes providing the base route.

As another example, the route monitoring module 760 can determine that the device 752 has navigated to a location that is not included in the base map 758, such as a segment of a roadway that is included on the tactical map 768 but is not included on the base map 758. The route planner module 756 transmits a message to the route registration module 766 that indicates that the base route cannot be determined because the current location does not correspond to a segment that is present in the base map 758. The route registration module 766 causes the fail-safe routing module 776 to determine a route from a current location of the device 752 to the destination as indicated by the route request 764 or to an intermediate destination. The fail-safe routing module 776 can determine the fail-safe tactical route using the tactical map 768 using conventional pathfinding techniques with segments lengths as cost factors, as previously described. In some implementations, the fail-safe routing module 776 can determine the fail-safe tactical route using the tactical map 768 using conventional pathfinding techniques including a cost function that uses only the segment lengths for segments of the tactical map 768 as cost factors.

The intermediate destination can be a segment that is present in the base map 758. As one example, the intermediate destination can be determined using information that describes a correspondence between the base map 758 and the tactical map 768, such as information from recent determination of the tactical route from the base route by the route registration module 766. As another example, the route planner module 756 of the server 750 can, based on the current location of the device 752 identify nearby base segments that are near the device 752. The route planner module 756 can transmit information identifying the nearby base segments to the route registration module 766. The route registration module 766 can utilize the information identifying the nearby base segments to identify nearby tactical segments that correspond to the nearby base segments by matching as previously described. The fail-safe routing module 776 selects one of the nearby tactical segments as the intermediate destination, and uses pathfinding techniques to determine the fail-safe tactical route to the intermediate destination, which is used as the output 772. During navigation using the fail-safe tactical route that was generated by the fail-safe routing module 776, the route monitoring module 760 can monitor the current position of the device 752. The fail-safe tactical route can be followed until the current location of the device 752 corresponds to a location that is included in the base map 758. Upon determining that the device 752 is present in a location that is included in the base map 758, the base route can be followed. Optionally, the route planner module 756 can determine and transmit an updated base route to the route registration module 766 of the device 752 upon determining that the device 752 is present in a location that is included in the base map 758.

Figure 8:
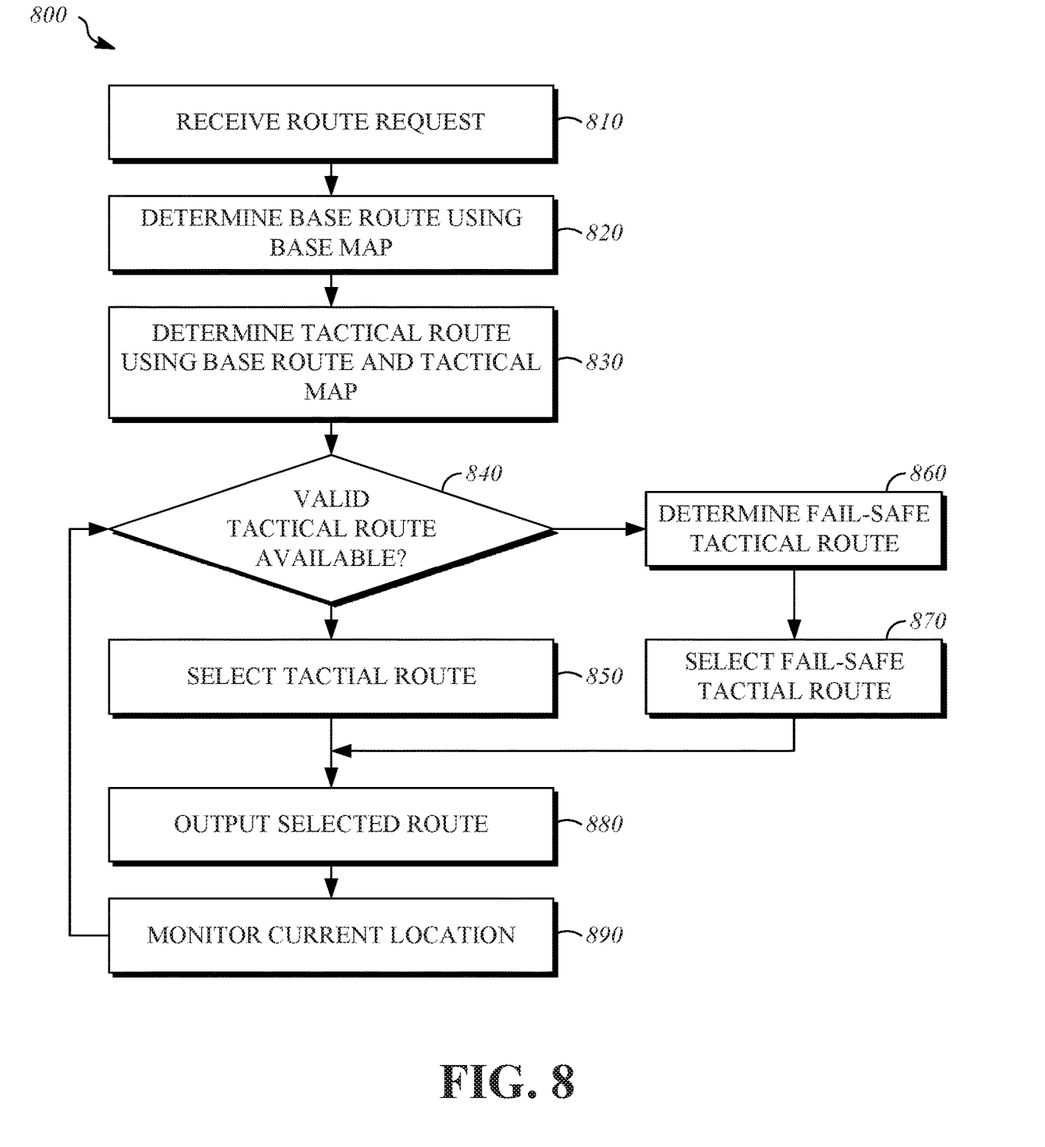
FIG. 8 is a flowchart that shows an example of a process for fail-safe routing.

FIG. 8 is a flowchart that shows an example of a process 800 for constrained registration of map information. The process 800 can be performed using the routing system 100, and operations of the process can be caused, controlled, or performed by a computing device. The computing device is provided with instructions that are stored in a storage device or a memory device, and a processor that is operable to execute the program instructions. When executed by the processor, the program instructions cause the computing device to perform the operations of the process 600 as described herein.

The route request 764 is received in operation 810. The route request can be, as examples, received by the server 750 or received by the device 752 and transmitted to the server 750. In operation 820, the route request 764 has been received at the server 750 and is used by the route planner module 756 to determine the base route using the base map 758, as previously described with respect to the route planner module 756. The base route is transmitted to the route registration module 766.

In operation 830, the tactical route is determined using the base route and the tactical map 768 as previously described with respect to the route registration module 766. In some situations, the tactical route cannot be created or followed in correspondence with the base route. As one example, the device 752 may not receive the base route from the server 750 due to an error, due to a communications network failure, or for other reasons. As another example, the device 752 may be currently in a location that is not included in the base map 758, and the tactical route cannot, therefore, be generated using the base route. The output of operation 830 can be, for example the tactical route or a message indicating that creation of the tactical route has failed.

In operation 840, a determination is made as to whether a valid tactical route is available. If no tactical route was created at operation 830 due to an error, it is determined that a valid tactical route is not available. If the tactical route was produced in operation 830 and can be followed in correspondence with the base route, it is determined that a valid tactical route is available. Thus, for example, if the current location of the device 752 does not correspond to any elements, such as segments, from the tactical route that was created in operation 840, it is determined that the tactical route cannot be followed and is therefore is not valid.

If the tactical route was created and can be followed in correspondence with the base route 126, it is determined in operation 840 that a valid tactical route is available, and the process 800 proceeds to operation 850, in which the tactical route is selected for use.

If it is determined that a valid tactical route is not available in operation 840, the process 800 proceeds to operation 860. At operation 860, the fail-safe route is determined in the manner described with respect to the fail-safe routing module 776, and the fail-safe tactical route is selected for use in operation 870.

In operation 880, the previously selected route is output for use, as described with respect to the output 772. The current location of the device 752 is monitored in operation 890 using, for example, the location subsystem 774. The process then returns to operation 830 where it is again determined whether the tactical route can be created and followed. Optionally, the process 800 can instead return to operation 820 to update the base route.

Figure 9:
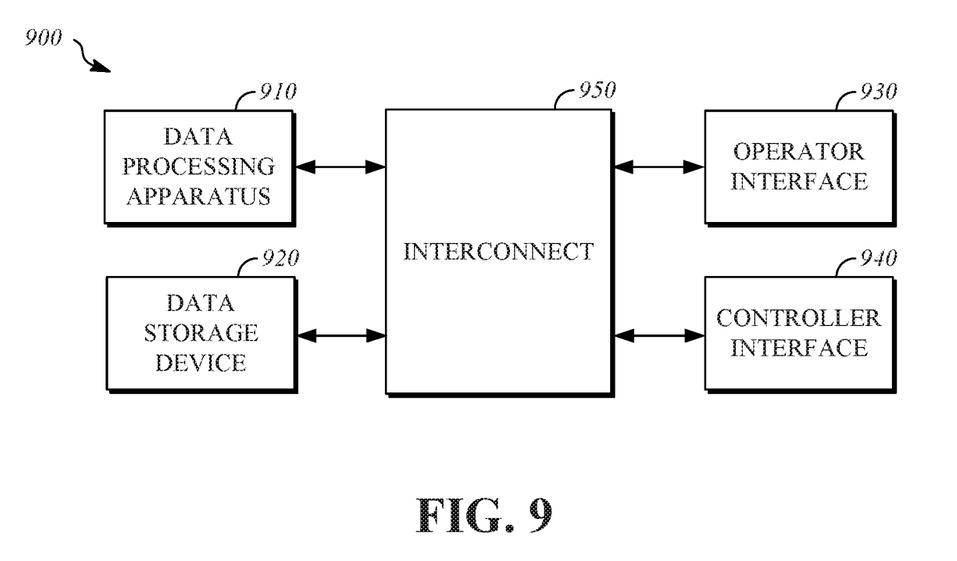
FIG. 9 is a block diagram that shows an example of a computing device.

FIG. 9 shows an example hardware configuration for a controller 900 that may be utilized to implement portions of the routing system 100 and the routing system 700. The hardware configuration includes a data processing apparatus 910, a data storage device 920, an operator interface 930, a controller interface 940, and an interconnect 950 through which the data processing apparatus 910 may access the other components. The data processing apparatus 910 is operable to execute instructions that have been stored in a data storage device 920. In some implementations, the data processing apparatus 910 is a processor with random access memory for temporarily storing instructions read from the data storage device 920 while the instructions are being executed. For example, the data storage device 920 may be a non-volatile information storage device such as a hard drive or a solid-state drive. The operator interface 930 facilitates communication with a user of the controller 900 and may include any type of human-machine interface such as buttons, switches, a touchscreen input device, a gestural input device, an audio input device, a display, and/or a speaker. The controller interface 940 allows input and output of information to other systems, as examples, for allowing display at an external system or for allowing automated control of another system. The interconnect 950 may be, as examples, a system bus, a wired network, or a wireless network.

What is claimed is:

1. A method, comprising:
    receiving a first route from a first location to a second location using a first map that includes first roadway segments, wherein the first route includes a series of the first roadway segments;
    transferring a representation of the first route from the first map to a second map that includes second roadway segments to define a second route from the first location to the second location by:
        matching the first route to the second roadway segments from the second map based on a distance between the first route and the second roadway segments so that the matching defines a subset of the second roadway segments that corresponds to the first route and includes fewer than all of the second roadway segments, and
        determining the second route from the first location to the second location using a first routing algorithm that uses the first location, the second location, and the subset of the second roadway segments as inputs so that the second route is constrained to the subset of the second roadway segments, and the second route includes a series of the second roadway segments from the subset of the second roadway segments; and
    controlling movement of a vehicle according to the second route using a computing device.

2. The method of claim 1, wherein matching the first route to the second roadway segments includes comparing the distance between the first route and the second roadway segments to a threshold distance.

3. The method of claim 1, wherein matching the first route to the second roadway segments includes comparing angles between the first route and the second roadway segments to a threshold angle.

4. The method of claim 1, wherein matching the first route to the second roadway segments includes comparing elevation information for the first route to elevation information for the second roadway segments.

5. The method of claim 1, wherein matching the first route to the second roadway segments includes comparing road type information for the first route to road type information for the second roadway segments.

6. The method of claim 1, wherein matching the first route to the second roadway segments includes defining multiple route points for each of the first roadway segments from the series of the first roadway segments by interpolation along each of the first roadway segments and comparing a distance between the route points and the second roadway segments to a threshold distance.

7. The method of claim 1, wherein the first route is determined using a second routing algorithm that determines an optimal route from the first location to the second location using a cost function.

8. The method of claim 7, wherein the second routing algorithm determines an optimal route from the first location to the second location.

9. The method of claim 1, further comprising:
    identifying additional second roadway segments from the second roadway segments based on proximity to the second roadway segments from the subset of the second roadway segments; and
    adding the additional second roadway segments to the subset of the second roadway segments.

10. The method of claim 1, wherein matching the first route to the second roadway segments defines the subset of the second roadway segments so that the subset of the second roadway segments includes only a fraction of the second roadway segments from the second map and so that the subset of the second roadway segments is linearly arranged along the first route.

11. The method of claim 1, further comprising:
    outputting information describing the second route for at least one of storage or display.

12. The method of claim 1, further comprising:
    transmitting information describing the second route to a remote device for at least one of storage or display at the remote device.

13. The method of claim 1, wherein controlling movement of the vehicle according to the second route comprises causing the vehicle to move toward the second location.

14. The method of claim 1, wherein the computing device is incorporated in an automated vehicle control system.

15. The method of claim 1, wherein the computing device is incorporated in a vehicle information system.

16. The method of claim 1, wherein the computing device is incorporated in a mobile computing device.

17. A non-transitory computer-readable storage device including program instructions executable by one or more processors that, when executed, cause the one or more processors to perform operations, the operations comprising:
receiving a first route from a first location to a second location using a first map that includes first roadway segments, wherein the first route includes a series of the first roadway segments from the first map;
transferring a representation of the first route from the first map to a second map that includes second roadway segments to define a second route from the first location to the second location by:
matching the first route to the second roadway segments from the second map based on a distance between the first route and the second roadway segments so that the matching defines a subset of the second roadway segments that corresponds to the first route and includes fewer than all of the second roadway segments, and
determining the second route from the first location to the second location using a routing algorithm that uses the first location, the second location, and the subset of the second roadway segments, wherein the second route is constrained to the subset of the second roadway segments, and the second route includes a series of the second roadway segments from the subset of the second roadway segments; and
controlling movement of a vehicle according to the second route using a computing device.

18. The non-transitory computer-readable storage device of claim 17, wherein matching the first route to the second roadway segments includes comparing the distance between the first route and the second roadway segments to a threshold distance.

19. The non-transitory computer-readable storage device of claim 17, wherein the first roadway segments include polyline segments, and matching the first route to the second roadway segments includes defining multiple route points for each of the first roadway segments from the series of the first roadway segments by interpolation along each of the first roadway segments and comparing a distance between the route points and the second roadway segments to a threshold distance.

20. The non-transitory computer-readable storage device of claim 17, wherein the routing algorithm determines an optimal route from the first location to the second location.

21. The non-transitory computer-readable storage device of claim 17, wherein matching the first route to the second roadway segments defines the subset of the second roadway segments so that the subset of the second roadway segments includes only a fraction of the second roadway segments from the second map and so that the subset of the second roadway segments is linearly arranged along the first route.

22. A system, comprising:
a memory; and
a processor configured to execute instructions stored in the memory to:
receive a first route from a first location to a second location using a first map that includes first roadway segments, wherein the first route includes a series of the first roadway segments from the first map;
transfer a representation of the first route from the first map to a second map that includes second roadway segments to define a second route from the first location to the second location by execution, by the processor, of further instructions stored in the memory to:
match the first route to the second roadway segments from the second map based on a distance between the first route and the second roadway segments to define a subset of the second roadway segments that corresponds to the first route and includes fewer than all of the second roadway segments, and
determine the second route from the first location to the second location using a routing algorithm that uses the first location, the second location, and the subset of the second roadway segments, wherein the second route is constrained to the subset of the second roadway segments, and the second route includes a series of the second roadway segments from the subset of the second roadway segments; and
control movement of a vehicle according to the second route using a computing device.

23. The system of claim 22, wherein the processor is further configured to execute instructions stored in the memory to match the series of the first roadway segments to the second roadway segments by comparing distances between the first roadway segments from the series of the first roadway segments and the second roadway segments to a threshold distance.

24. The system of claim 22, wherein the first roadway segments include polyline segments, and the processor is further configured to execute instructions stored in the memory to match the first roadway segments from the series of the first roadway segments to the second roadway segments by defining multiple route points for each of the first roadway segments from the series of the first roadway segments by interpolation along each of the first roadway segments and comparing a distance between the route points and the second roadway segments to a threshold distance.

25. The system of claim 22, wherein the routing algorithm determines an optimal route from the first location to the second location.

26. The system of claim 22, wherein matching the first route to the second roadway segments defines the subset of the second roadway segments so that the subset of the second roadway segments includes only a fraction of the second roadway segments from the second map and so that the subset of the second roadway segments is linearly arranged along the first route.

* * * * *